United States Patent
Dong et al.

(10) Patent No.: US 11,442,636 B2
(45) Date of Patent: Sep. 13, 2022

(54) METHOD, APPARATUS FOR MANAGING THE REDUNDANT ARRAY OF INDEPENDENT DISKS (RAID) AND RELATED COMPUTER READABLE MEDIUM

(71) Applicant: EMC IP Holding Company LLC, Hopkinton, MA (US)

(72) Inventors: Jibing Dong, Beijing (CN); Jian Gao, Beijing (CN); Jianbin Kang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 425 days.

(21) Appl. No.: 16/655,401

(22) Filed: Oct. 17, 2019

(65) Prior Publication Data

US 2020/0133536 A1  Apr. 30, 2020

(30) Foreign Application Priority Data

Oct. 31, 2018 (CN) .......................... 201811288792.1

(51) Int. Cl.
  *G06F 11/20* (2006.01)
  *G06F 3/06* (2006.01)
  *G06F 11/10* (2006.01)

(52) U.S. Cl.
  CPC ............ *G06F 3/0631* (2013.01); *G06F 3/061* (2013.01); *G06F 3/0644* (2013.01); *G06F 3/0689* (2013.01); *G06F 11/1092* (2013.01); *G06F 11/2094* (2013.01); *G06F 2201/82* (2013.01)

(58) Field of Classification Search
  CPC .............. G06F 3/0631; G06F 11/1084; G06F 11/1088; G06F 11/1092; G06F 11/2094; G06F 2201/82
  See application file for complete search history.

(56) References Cited

U.S. PATENT DOCUMENTS

| 10,365,827 B1 * | 7/2019 | Satish ................... G06F 3/0608 |
| 10,379,950 B2 | 8/2019 | Gholamipour et al. |
| 10,402,267 B2 | 9/2019 | Lim |
| 10,452,471 B2 | 10/2019 | Shen et al. |

(Continued)

FOREIGN PATENT DOCUMENTS

CN  107239234 A * 10/2017 ......... G06F 12/1009

*Primary Examiner* — Yolanda L Wilson
(74) *Attorney, Agent, or Firm* — BainwoodHuang

(57) ABSTRACT

A technique involves: in response to a stripe being created in a Redundant Array of Independent Disks (RAID), allocating to the stripe a storage space for storing a predetermined number of mapping information elements; creating one or more mapping information elements for the stripe; storing the one or more mapping information elements in the storage space; allocating respective storage sequence numbers to the one or more mapping information elements stored in the storage space; and in response to receiving an I/O request for the stripe indicating one of the respective storage sequence numbers, accessing the stripe based on the mapping information element in the storage space that is corresponding to the storage sequence number indicated by the I/O request. Such a technique can facilitate when disks encounter "glitch issues" simultaneously under extreme situations and effectively improve I/O read and write performance of a storage system.

21 Claims, 7 Drawing Sheets

(56) References Cited

U.S. PATENT DOCUMENTS

| | | |
|---|---|---|
| 10,564,878 B2 | 2/2020 | Kang et al. |
| 10,671,494 B1* | 6/2020 | Abrol .................. G06F 11/1469 |
| 2005/0086429 A1* | 4/2005 | Chatterjee ........... G06F 11/1096 |
| | | 714/E11.034 |
| 2005/0120267 A1* | 6/2005 | Burton ................ G06F 11/0793 |
| | | 714/13 |
| 2005/0210218 A1* | 9/2005 | Hoogterp ............ H04L 67/1097 |
| | | 711/159 |
| 2006/0156059 A1* | 7/2006 | Kitamura ............ G06F 11/1092 |
| | | 714/6.21 |
| 2009/0240873 A1* | 9/2009 | Yu ........................ G06F 3/0608 |
| | | 711/E12.001 |
| 2016/0196216 A1* | 7/2016 | Lee ....................... G06F 3/0688 |
| | | 711/170 |
| 2016/0364181 A1* | 12/2016 | McGlaughlin ........ G06F 3/0688 |
| 2019/0129643 A1* | 5/2019 | Sun ....................... G06F 3/0661 |

* cited by examiner

METHOD, APPARATUS FOR MANAGING THE REDUNDANT ARRAY OF INDEPENDENT DISKS (RAID) AND RELATED COMPUTER READABLE MEDIUM

CROSS-REFERENCE TO RELATED APPLICATION

This application claims priority to Chinese Patent Application No. CN201811288792.1, on file at the China National Intellectual Property Administration (CNIPA), having a filing date of Oct. 31, 2018, and having "METHOD, APPARATUS FOR MANAGING THE REDUNDANT ARRAY OF INDEPENDENT DISKS (RAID) AND RELATED COMPUTER READABLE MEDIUM" as a title, the contents and teachings of which are herein incorporated by reference in their entirety.

FIELD

Embodiments of the present disclosure relate to the field of computers, and more specifically, to method and apparatus for managing a Redundant Array of Independent Disks (RAID) and related computer readable medium.

BACKGROUND

A RAID is a data storage virtualization technology that combines multiple physical drive components (e.g., disks) into a single logical unit for the purposes of data redundancy, performance improvement, or both. Data is distributed across the physical drive components in one of several ways, referred to as RAID levels, depending on the required level of redundancy and performance. Stripes in a RAID are built based on a plurality of extents distributed across a plurality of disks and the stripe contains a corresponding mapping information element for recording respective positions of extents included in the stripe on the plurality of disks. A storage system will perform I/O read and write operations in accordance with position mapping information provided by the above mapping information element.

Existing RAID-based storage systems usually only have a limited storage space for storing the above mapping information element. However, when a plurality of disks encounters "glitch issue" simultaneously, the limited storage space may be insufficient, such that the storage system cannot normally perform the I/O read and write operations. It is expected to provide an improved solution to perfect or optimize the I/O read and write performance under the above condition.

SUMMARY

Example embodiments of the present disclosure provide a solution for managing RAID.

In a first aspect of the embodiments of the present disclosure, there is provided a method for managing a Redundant Array of Independent Disks (RAID). The method includes: in response to a stripe being created in the RAID, allocating to the stripe a storage space for storing a predetermined number of mapping information elements, the RAID being built on a plurality of extents divided from a plurality of disks, wherein the stripe includes a portion of the plurality of extents and a mapping information element of the stripe records respective positions of extents included in the stripe at the plurality of disks; creating one or more mapping information elements for the stripe; storing the one or more mapping information elements in the storage space; allocating respective storage sequence numbers to the one or more mapping information elements stored in the storage space, to record an order in which each mapping information element of the one or more mapping information elements is stored in the storage space; and in response to receiving an I/O request for the stripe indicating one of the corresponding storage sequence numbers, accessing the stripe based on a mapping information element corresponding to the storage sequence number indicated by the I/O request in the storage space.

In a second aspect of the embodiments of the present disclosure, there is provided a device for managing a Redundant Array of Independent Disks (RAID). The device includes a processing unit; and a memory having instructions stored, the instructions, when executed by the processing unit, causing the device to perform acts of: in response to a stripe being created in the RAID, allocating to the stripe a storage space for storing a predetermined number of mapping information elements, the RAID being built on a plurality of extents divided from a plurality of disks, wherein the stripe includes a portion of the plurality of extents and a mapping information element of the stripe recording respective positions of extents included in the stripe at the plurality of disks; creating one or more mapping information elements for the stripe; storing the one or more mapping information elements in the storage space; allocating corresponding storage sequence numbers to the one or more mapping information elements stored in the storage space, to record an order in which each mapping information element of the one or more mapping information elements is stored in the storage space; and in response to receiving an I/O request for the stripe indicating one of the corresponding storage sequence numbers, accessing the stripe based on the mapping information element in the storage space that is corresponding to the storage sequence number indicated by the I/O request.

In a third aspect of the embodiments of the present disclosure, there is provided a computer-readable medium. The computer-readable medium having a computer program stored thereon which, when executed by a processor, performs the method according to the above first aspect.

It should be appreciated that the contents described in this Summary are not intended to identify key or essential features of the embodiments of the present disclosure, or limit the scope of the present disclosure. Other features of the present disclosure will be understood more easily through the following description.

BRIEF DESCRIPTION OF THE DRAWINGS

Through the following detailed description with reference to the accompanying drawings, the above and other features, advantages and aspects of every embodiment of the present disclosure will become more apparent. In the drawings, same or similar reference signs represent same or similar elements, wherein.

DETAILED DESCRIPTION OF EMBODIMENTS

Figure 1:
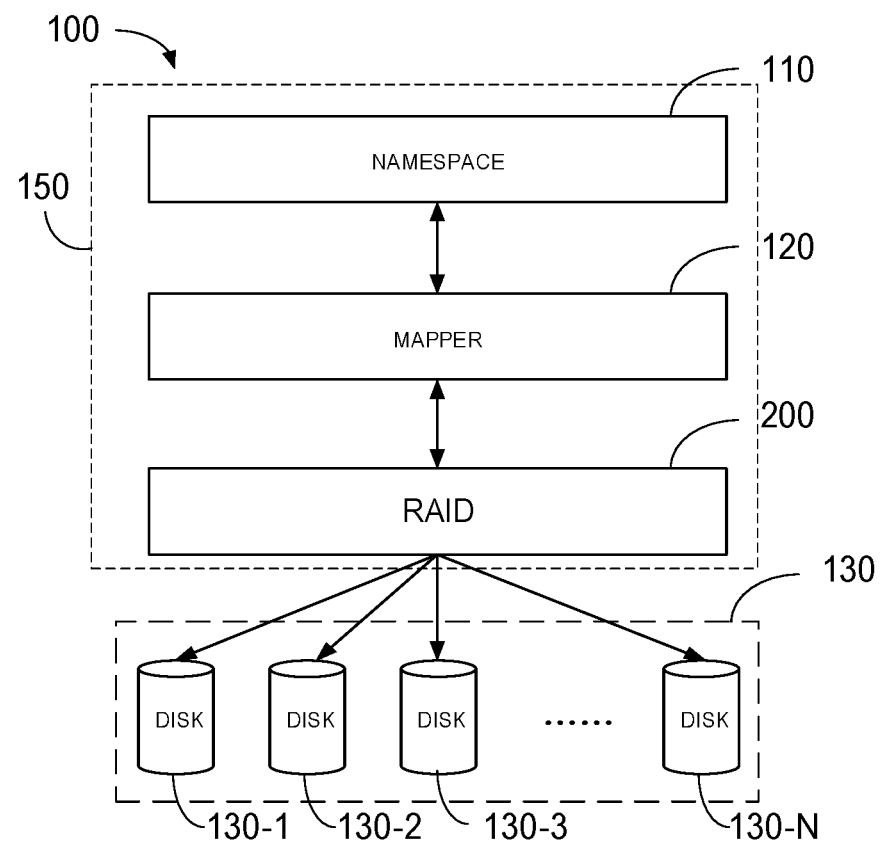
FIG. 1 illustrates an example architecture diagram of a storage system in accordance with embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described in more details with reference to the drawings. Although the drawings illustrate some embodiments of the present disclosure, it should be appreciated that the present disclosure can be implemented in various manners and should not be interpreted as being limited to the embodiments explained herein. On the contrary, the embodiments are provided to understand the present disclosure in a more thorough and complete way. It should be appreciated that drawings and embodiments of the present disclosure are provided only for the purpose of examples rather than restricting the protection scope of the present disclosure.

In description of the embodiments of the present disclosure, the term "comprise/include" used herein and its variants are to be read as an open-ended term that means "include, but is not limited to." The term "based on" is to be read as "based at least in part on." The term "one embodiment" is to be read as "at least one embodiment." The following text also can include other explicit and implicit meanings. In addition, the terms "I/O," "I/O request" and "I/O operation" can be used interchangeably in description of the embodiments of the present disclosure for the sake of convenience.

As described above, a stripe in RAID is built based on a plurality of extents distributed across a plurality of disks and the stripe contains a corresponding mapping information element for recording respective positions of extents included in the stripe on the plurality of disks. A storage system will perform I/O read and write operations in accordance with position mapping information provided by the above mapping information element. A traditional RAID-based storage system usually only has a limited storage space for storing the above mapping information element. However, when a plurality of disks encounters "glitch issues" simultaneously, the limited storage space may be insufficient, such that the storage system cannot normally perform the I/O read and write operations.

Embodiments of the present disclosure provide a solution for managing a RAID. The solution overcomes the issue of insufficient storage space for the mapping information existing in the traditional storage system in some cases, by storing a newly created mapping information element through overriding a stored mapping information element in the storage space and allocating a storage sequence number to each stored mapping information element. Besides, the solution can access data in the RAID stripe based on a mapping information element corresponding to the storage sequence number indicated by the I/O request and related information. In this way, when some disks related to the RAID stripe are recovered quickly from a brief failure, the solution can access the stripe normally rather than in a degraded manner ("degraded access" referring to calculating the data in a faulted disk based on the data in a non-faulted disk to access the data in the stripe). Apparently, the solution can effectively enhance the access performance of the system.

FIG. 1 illustrates an architecture diagram of a storage system 100 in accordance with embodiments of the present disclosure. As shown in FIG. 1, the storage system 100 can include a plurality of storage disks 130-1, 130-2, . . . , 130-N (collectively known as "storage disk 130," where N is a positive integer). "Storage disk" described here can refer to any currently known or to be developed non-volatile storage medium, such as disks, optical disks or Solid-State Disks (SSD) and the like. In description of the text, the disk serves as an example of the storage disk. However, it should be appreciated that this is only for the purpose of description without suggesting any restrictions over the scope of the present disclosure.

Each storage disk 130 can be divided into a plurality of extents. It should be understood that a size of an extent can be determined according to requirements. For example, the extent is on the order of GB in size (e.g., one extent being configured to be 4 GB). At least a part of extents in the plurality of extents are organized into a disk array. The disk array, for example, can be a Redundant Array of Independent Disks (RAID), which usually combines a plurality of physical storage units into logical storage units for the purpose of data redundancy backup and/or performance improvement. In accordance with the required redundancy and performance level, a RAID can have different types, such as RAID 0, RAID 1, . . . , RAID 5 etc.

The storage system 100 also can include a storage processor 150 for managing the storage disk 130. The storage processor 150, for example, can further include a namespace 110, a mapper 120 and a RAID 200. The mapper 120 is used for providing a mapping relation between a physical storage position occupied by a RAID and a logical storage position utilized by the namespace 110. The namespace 110 implements mapping from the logical position to the physical position via calling an API of the mapper 120.

When a user of the storage system 100 is writing or reading data, the user sends, via a host (not shown), an instruction for writing or reading data to the namespace 110.

The namespace 110 processes the instruction and then sends it to the mapper 120, which looks up a position where data should be written or read through an internal mapping relation and sends the position information to the RAID 200. The RAID 200 uses the position information to process the instruction of writing or reading data of the user.

Figure 2:
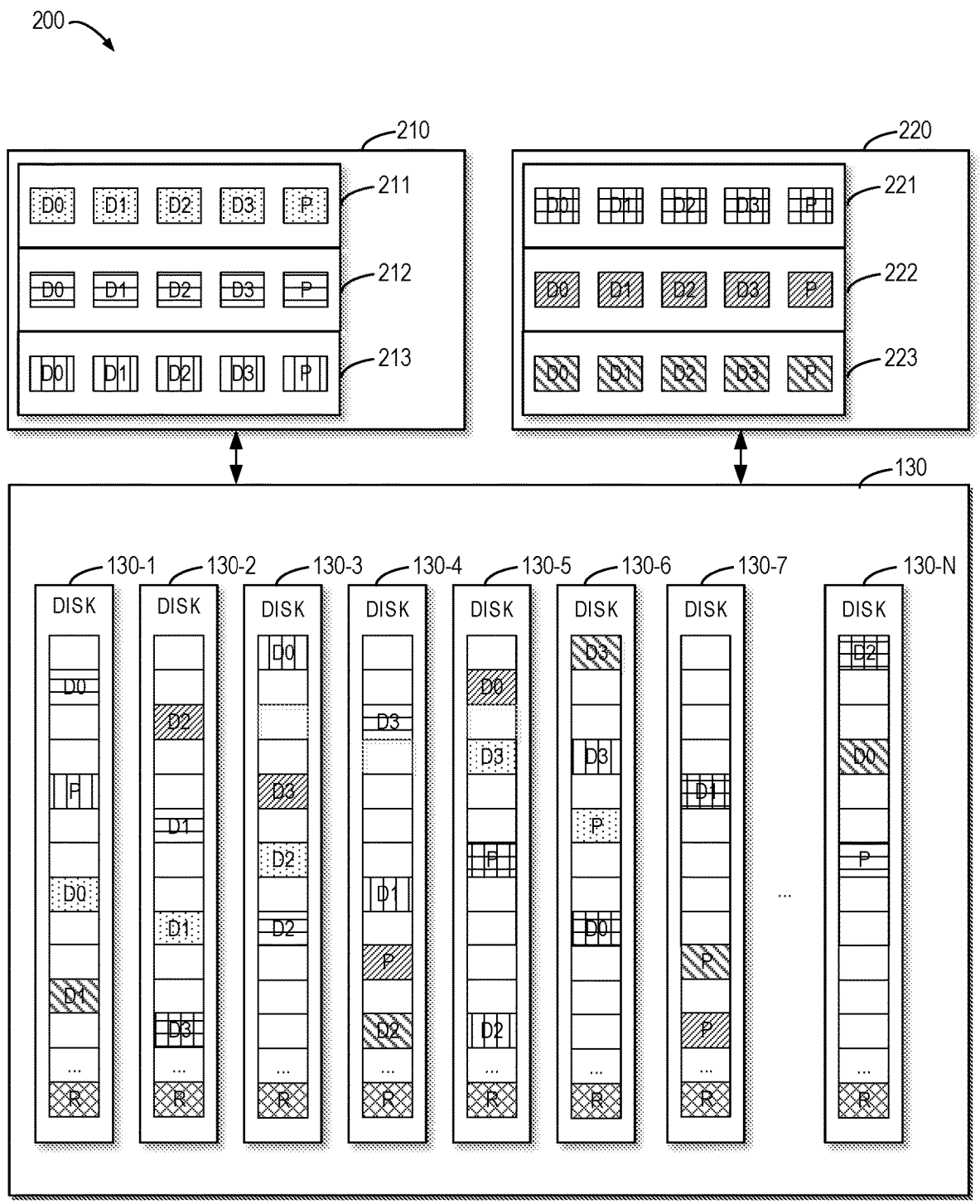
FIG. 2 illustrates a schematic diagram of an example layout of the RAID in accordance with embodiments of the present disclosure.

FIG. 2 illustrates a schematic diagram of an example mapped RAID 200 in accordance with embodiments of the present disclosure, wherein an example of the mapped RAID constructed on a plurality of disks 130 of FIG. 1 is shown. According to FIG. 2, for example, an RAID 5 with a layout of 4D+1P is constructed on N disks 130-1~130-N, where N is greater than 5. In the example shown by FIG. 2, D0~D3 respectively indicate a data extent for storing user data and P represents a parity extent for storing parity information. When one RAID stripe (including D0~D3 and P) is created, five extents can be randomly selected from five different disks. Accordingly, the user data and the parity information are evenly distributed into all disks. For example, in the example of FIG. 2, a RAID group 210 and a RAID group 220 are created on the disk 130, wherein the RAID group 210 can include RAID stripes 211, 212 and 213 while the RAID group 220 can consist of RAID stripes 221, 222 and 223. In addition, some backup extents are reserved on the disk 130 and represented by R for example, to ensure reliability of the mapped RAID. When a certain disk in the disk 130 breaks down, the backup extents can be provided for rebuilding the fault-related RAID stripe, so as to avoid loss of data.

In some embodiments, the I/O request for a storage device can be an I/O request directed against a certain RAID stripe (e.g., a RAID stripe 211, 212, 213, 221, 222 or 223) shown in FIG. 2. For example, the storage processor 150 can maintain a mapping relation between the RAID stripes and the disk 130, and can determine, based on the mapping relation, one or more disks 130 involved in the I/O request. Take the RAID stripe 211 as an example and the request for the RAID stripe 211 will involve disks 130-1, 130-2, 130-3, 130-5 and 130-6. In terms of the RAID stripe 221, the request for the RAID stripe 221 will involve disks 130-6, 130-7, 130-N, 130-2 and 130-5.

As described above, stripes in the RAID are built based on a plurality of extents distributed across a plurality of disks and each stripe can have a corresponding mapping information element to record respective positions of the extents included in the stripe on the plurality of disks. The mapping information element, for example, can be stored in a predetermined storage space (e.g., a memory) of the storage system 100 shown in FIG. 1. In response to a read/write request of the I/O, the mapper 120 can call the mapping information element from the predetermined storage space, so as to access the disks mapped by the mapping information element.

In order to more clearly understand the management of the embodiments of the present disclosure for the above mapping information element when a plurality of disks encounter "glitch issues" successively, the management method for the above mapping information element in the traditional solution will be described first through FIG. 3.

Figure 3:
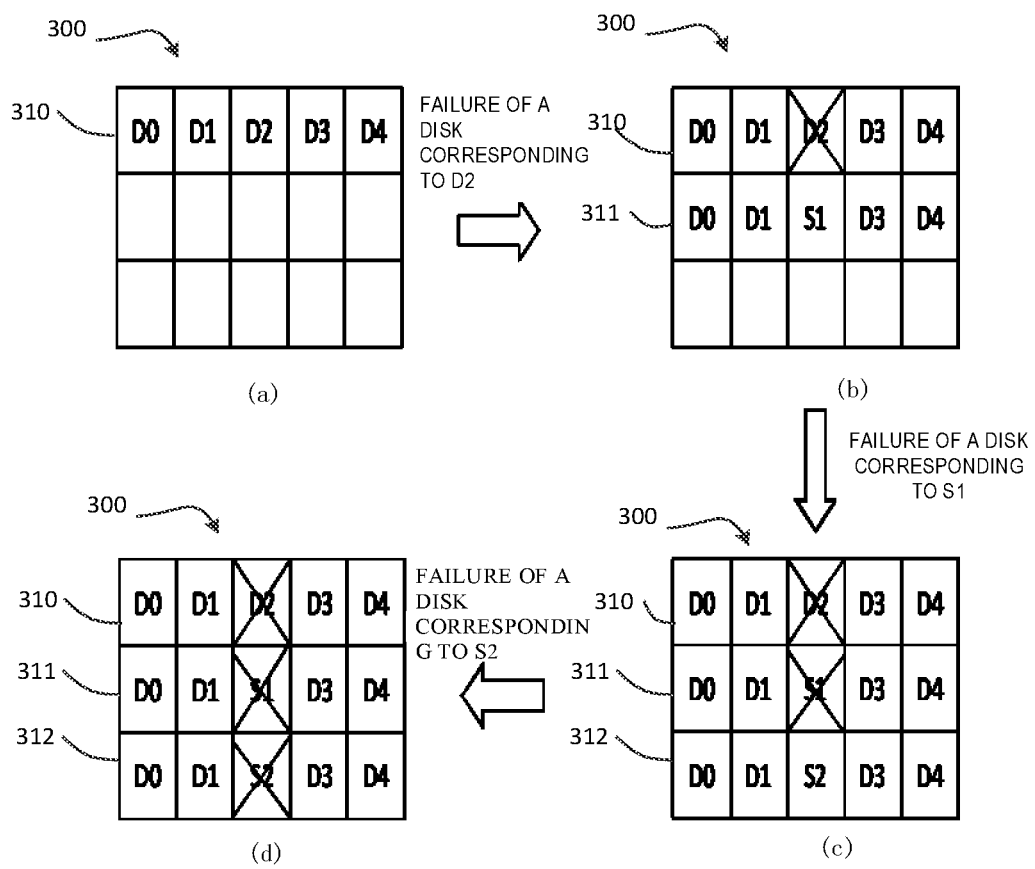
FIG. 3 illustrates a schematic diagram of storing the mapping information element when disks corresponding to the extents in the stripe encounter glitch issues successively in the traditional solution.

FIG. 3 illustrates a schematic diagram of storing the mapping information element when disks corresponding to the extents in the stripe encounter glitch issues successively in a traditional solution, wherein the mapping information element is provided for recording respective positions of the extents included in the stripe on the plurality of disks. Furthermore, the mapping information element can include a plurality of mapping information items, each of which separately maps a respective position of the extent on the disk.

In order to clearly illustrate the procedure of storing the mapping information elements corresponding to the RAID stripe, FIG. 3 takes the RAID 5 with a layout of 4D+1P as an example for description. It will be understood that the example of the RAID 5 with a layout of 4D+1P described below is only by way of example and shall not constitute any restrictions over the present disclosure.

According to (a) in FIG. 3, the system will initially create, for every created stripe, a first mapping information element 310 corresponding to extents in the stripe and store the first mapping information element 310 in a first space of the storage space 300. In case of the RAID 5 with a layout of 4D+1P, the mapping information element 310 will consist of five mapping information items D0, D1, D2, D3 and D4 in one-to-one correspondence with five extents (regarded as "first set of extents") in the stripe, and each mapping information item separately maps a respective position of the disk where the corresponding extent locates.

When the respective disk operates normally, the system can perform I/O read and write operations in accordance with the first mapping information element 310 only. However, in some cases, the working disks in the storage system may encounter "glitch issues" due to various reasons of software or hardware (a disk with "a glitch issue" may go offline or break down at this time). By this time, the storage system cannot implement normal I/O read and write operations on the disk with "a glitch issue," which is not desired for the storage system designed for high performance.

In view of such case, the traditional solution is such designed that a storage space 300 available for storing a plurality of mapping information elements is allocated for each created stripe. For instance, in the example of FIG. 3, for each created stripe a storage space 300 that can be used for storing e.g., 3 mapping information elements is allocated. It will be understood that the system can allocate a storage space 300 for storing more or less number of mapping information elements in other embodiments.

Based on such design, in case of the RAID 5 with a layout of 4D+1P for example, once a disk mapped by one (which is assumed to correspond to a mapping information item D2) of the 5 extents (regarded as "a first set of extents") in the stripe breaks down, as shown in (b) of FIG. 3, the system will create a second mapping information element 311, wherein the second mapping information element 311 copies mapping information items in the first mapping information element 310 and replaces the mapping information item D2 corresponding to the extent of the faulted disk with a mapping information item S1 corresponding to a reserved extent of other disks. Furthermore, the second mapping information element 311 is stored in a remaining space of the storage space 300. At this moment, the storage system will further continue the I/O write operation based on the second mapping information element 311 instead of the first mapping information element 310. It will be understood that the second mapping information element 311 in fact is created as a backup mapping information element of the first mapping information element 310. Now, the I/O write operation based on the second mapping information element 311 will not be affected by the failure of the mapped disk in the first mapping information element 310 and can continue to keep the normal performance of the I/O read and write operations.

However, it is still possible that the disk corresponding to the mapping information item S1 on the second mapping information element 311 will malfunction due to some reasons (for example, a plurality of disks in the same column of a disk cabinet powers down simultaneously). In such case, the system will create a third mapping information element 312 in some embodiments as shown in (c) of FIG. 3, wherein the third mapping information element 312 copies the mapping information items in the second mapping information element 311 and replaces the mapping information item S1 corresponding to the faulted disk with a mapping information item S2 corresponding to the reserved extent of other disks. Furthermore, the third mapping information element 312 is stored in the remaining space of the storage space 300. It will be understood that the third mapping information element 312 in fact is created as a backup mapping information element of the second mapping information element 311. At this moment, the I/O write operation based on the third mapping information element 312 will not be affected by the failure of the previous disks mapped by the first mapping information element 310 and the second mapping information element 311 and can continue to keep the normal performance of the I/O read and write operations.

In most cases, it is sufficient to create a second mapping information element 311 as a backup mapping information element for a first mapping information element 310 and to create a third mapping information unit 312 as a backup mapping information element for the second mapping information element 311. However, in some situations (for example, a plurality of disks in the same column of a disk cabinet powers down simultaneously), one of the disks mapped by the third mapping information element 311 may also fail, which is the case illustrated in (d) of FIG. 3. At this point, although the system can create a new mapping information element, the storage space 300 allocated for each stripe lacks any available space to store the new mapping information element. Therefore, the system either writes the data into the disks in a degraded manner or pauses the I/O write operation to wait for reoverride or replacement of the faulted disk.

It should be noted that although the above description of FIG. 3 takes the case when the mapping information items D2, S1 and S2 are in the same column of the table of FIG. 3 (this case occurs possibly because a plurality of disks mapped by D2, S1 and S2 are in the same column of a disk cabinet and power down at the same time) as an example, it will be appreciated that it is also possible in other embodiments that the mapping information items corresponding to the plurality of disks with glitch issues are in different columns of the table of FIG. 3.

Apparently, no matter whether the mapping information items corresponding to the plurality of disks with glitch issues are in the same column or in different columns in the traditional solution, the storage space 300 may be depleted and cannot store a newly created mapping information element once a plurality of disks encounters the glitch issues simultaneously. In such a case, the storage system can only access the RAID stripe in a degraded manner instead of a normal manner, which accordingly affects the access performance of the storage system.

To address the above problem, in some embodiments, when a newly created mapping information element is stored, it can be firstly determined whether a sufficient blank space for storing a newly created mapping unit is present in the storage space. If the storage space is insufficient, the newly created mapping information element is stored by overriding the mapping information element which is earliestly stored in the storage space; meanwhile, a corresponding storage sequence number is allocated to each of the mapping information elements stored into the storage space, so as to record a sequence of each of the mapping information elements being stored in the storage space. Hence, the problem of lacking sufficient storage space of the mapping information in the traditional storage system under some situations can be overcome.

Figure 4:
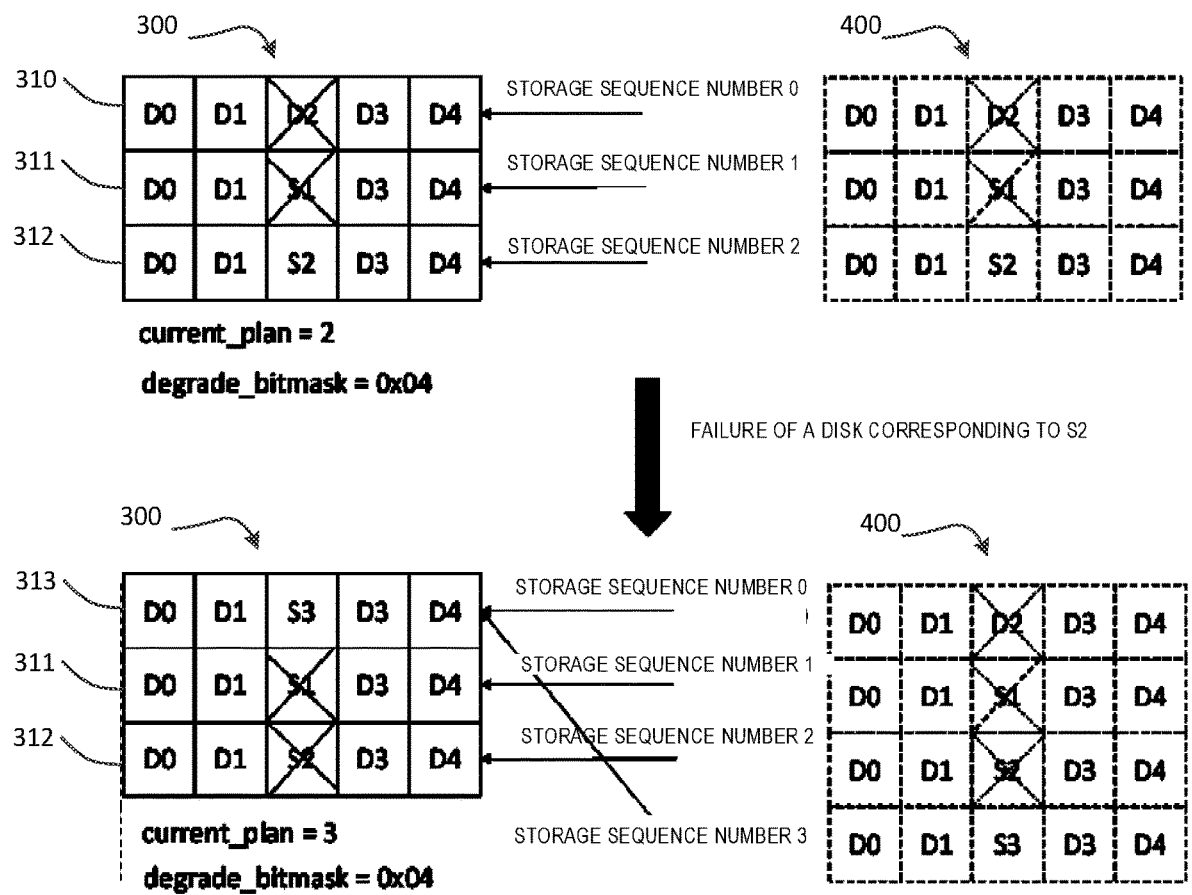
FIG. 4 illustrates a schematic diagram of storing the mapping information element when disks corresponding to the extents in the stripe encounter glitch issues successively in accordance with embodiments of the present disclosure.

FIG. 4 illustrates a schematic diagram of storing the mapping information element when disks corresponding to the extents in the stripe encounter the glitch issues successively in accordance with embodiments of the present disclosure.

Operations shown in FIG. 4 differ from those in FIG. 3 in that: every time a newly created mapping information element is stored, it is required to determine whether there is a sufficient storage space in the storage space 300; if so, a newly created mapping information element is stored into the remaining space of the storage space 300; if not, the newly created mapping information element is stored by overriding the mapping information element that is earliestly stored in the storage space. Meanwhile, a storage sequence number corresponding to each mapping information element stored into the storage space 300 is recorded and the last recorded storage sequence number is marked as the current storage sequence number (current_plan).

Specifically, for example, when a first mapping information element 310 is stored, it is determined first whether there is a sufficient storage space for storing the first mapping information element 310 in the storage space 300; if so, the first mapping information element 310 is stored into the remaining space of the storage space 300 and a storage sequence number 0 corresponding to the first mapping information element 310 is recorded simultaneously. At this point, the storage sequence number 0 points to the first mapping information element 310 and the recorded mapping information items are D0, D1, D2, D3 and D4. The current storage sequence number current_plan can be indicated as 0.

In response to a failure of a disk mapped by the mapping information item D2 in the first mapping information element 310, a second mapping information element 311 is created and it is determined whether there is a sufficient storage space for storing the second mapping information element 311. If so, the second mapping information element 311 is stored into the remaining space of the storage space 300, wherein the mapping information item D2 of the first mapping information element 310 corresponding to the faulted disk is replaced by the mapping information item S1 that maps other disk; meanwhile a storage sequence number 1 corresponding to the second mapping information element 311 is recorded and the storage sequence number 1 at this time points to the second mapping information element 311 and the recorded mapping information items are D0, D1, 51, D3 and D4. The current storage sequence number current_plan is incremented to 1.

In response to a failure of a disk mapped by the mapping information item S1 of the second mapping information element 311, a third mapping information element 312 is created and it is determined whether there is a sufficient storage space for storing the third mapping information element 312 in the storage space 300. If so, the third mapping information element 312 is stored into the remaining space of the storage space 300, wherein the mapping information item S1 of the second mapping information element 311 corresponding to the faulted disk is replaced by a mapping information item S2 that maps other disk; meanwhile a storage sequence number 2 corresponding to the third mapping information element 312 is recorded and the storage sequence number 2 at this time points to the third mapping information element 312 and the recorded mapping information items are D0, D1, S2, D3 and D4. The current storage sequence number current_plan is incremented to 2.

In response to a failure of a disk mapped by the mapping information item S2 of the third mapping information element 312, a fourth mapping information element 313 is created and it is determined whether there is a sufficient storage space for storing the fourth mapping information element 313 in the storage space 300. Assuming that it is determined there lacks a sufficient storage space at this time, the storage system stores the fourth mapping information element 313 by overriding the mapping information element information element that is earliestly stored in the storage space (i.e., the first mapping information element 310); wherein the mapping information item S2 of the third mapping information element 312 corresponding to the faulted disk is replaced by a mapping information item S3 that maps other disk; meanwhile a storage sequence number 3 corresponding to the fourth mapping information element 313 is recorded and the storage sequence number 3 at this time points to the fourth mapping information element 313 and the recorded mapping information items are D0, D1, S3, D3 and D4. The current storage sequence number current_plan is incremented to 3.

Furthermore, if a disk mapped by the mapping information item S3 of the fourth mapping information element 314 fails, operations similar to creating and storing the fourth mapping information element 313 can be repeated, so as to create and store a fifth mapping information element (not shown). The fifth mapping information element will override the second mapping information element 311 and the mapping information item S1 of the second mapping information element 311 corresponding to the faulted disk will be replaced by a mapping information item that maps other disk, and a storage sequence number corresponding to the fifth mapping information element is recorded. At this moment, the current storage sequence number current_plan can be incremented correspondingly to 4 and so on in a similar fashion. Therefore, in accordance with embodiments of the present disclosure, it is possible to continue storing a newly created mapping information element into a limited storage space even if the storage space is limited and the mapping information element corresponding to each storage sequence number can be obtained by recording the storage sequence number.

It should be noted: FIG. 4 depicts the content 400 of the mapping information element corresponding to each storage sequence number in dashed lines to facilitate understanding. It should be appreciated that the storage of the contents 400 depicted in dashed lines are not real.

Figure 5:
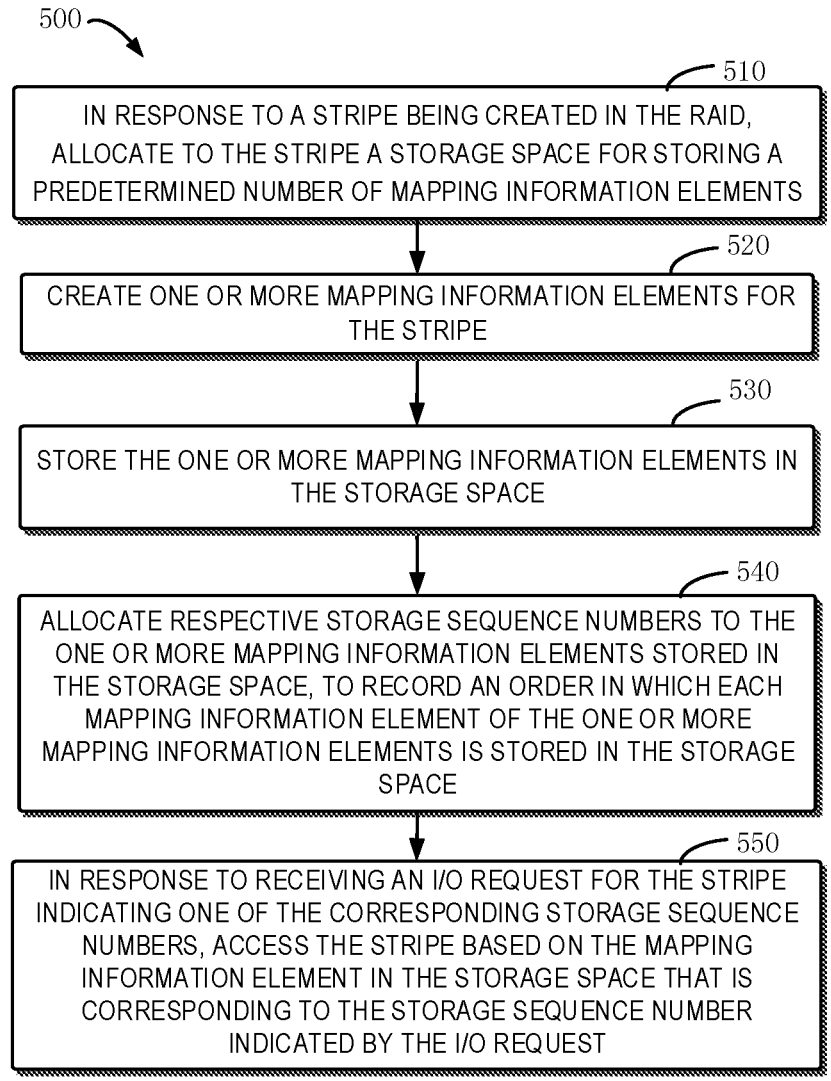
FIG. 5 illustrates a flowchart of a method for managing a Redundant Array of Independent Disks (RAID) in accordance with embodiments of the present disclosure.

FIG. 5 illustrates a flowchart of a method 500 for managing a Redundant Array of Independent Disks (RAID) in accordance with embodiments of the present disclosure. The method 500, for example, can be executed by a storage processor 150 shown in FIG. 1. The method in FIG. 5 is implemented on the basis of the concept of FIG. 4. Implementations of each step in the method 500 shown by FIG. 5 will be described with reference to FIGS. 4 and 5.

According to FIG. 5, in response to a stripe being created in a RAID, a storage space for storing a predetermined number of mapping information elements is allocated for the stripe at block 510, the RAID being built on a plurality of extents divided from a plurality of disks, wherein the stripe includes a portion of the plurality of extents and a mapping information element of the stripe records respective positions of extents included in the stripe at the plurality of disks.

As an example, according to e.g., FIG. 4, a storage space 300 for storing a predetermined number (e.g., 3) of mapping information elements can be allocated to each stripe in a RAID. In other embodiments, the storage space 300 can be bigger or smaller, so as to accommodate more or less number of mapping information elements. In addition, it will be understood that allocating a larger storage space to each stripe in a RAID for accommodating a larger number of mapping information elements means occupying more space of a memory. This is not desired for some storage systems. Hence, only a storage space for storing a limited number (usually smaller than or equal to 3) of mapping information elements is generally allocated for each stripe in a RAID in a storage system.

Next, one or more mapping information elements (e.g., 310, 311, 312 and 313 in FIG. 4) of the stripe are created at block 520. In some embodiments, for example, when the stripe is created, a first mapping information element (e.g., mapping information element 310 shown in FIG. 4) of the stripe can be created and the first mapping information element is provided for recording respective positions of a plurality of extents included in the stripe on the plurality of disks, wherein the plurality of extents mapped by the first mapping information element can be indicated as a first set of extents.

Additionally or alternatively, in some embodiments, in response to a failure of a disk where a first extent of the first set of extents is located, a second set of extents corresponding to the stripe is obtained by replacing the first extent in the first set of extents with a second extent of the plurality of extents; and a second mapping information element (e.g., mapping information element 311 in FIG. 4) of the stripe is created to record respective positions of the second set of extents on the plurality of disks.

At block 530, the one or more mapping information elements are stored in the storage space.

In some embodiments, for example, in response to determining there is a sufficient storage space in the storage space 300, the created mapping information element can be stored in the remaining space of the storage space 300.

For example, in some embodiments, in response to determining there is a sufficient storage space in the storage space 300, the first mapping information element (e.g., 310 in FIG. 4) can be stored in a first space of the storage space 300. Moreover, in response to determining there is a sufficient storage space in the storage space 300, a second mapping information element (e.g., 311 in FIG. 4) can be stored in a second space of the storage space 300.

In some embodiments, for example, in response to determining an insufficient storage space in the storage space 300, the created mapping information element can be stored by overriding the mapping information element that is earliestly stored in the storage space.

For example, in some embodiments, when it is determined that there lacks a sufficient storage space for storing the created mapping information element (e.g., 313 in FIG. 4) in the storage space 300, the system can override the mapping information element (e.g., mapping information element in FIG. 4) that is earliestly stored in the storage space 300 with the created mapping information element (such as 313 in FIG. 4), so as to store the mapping information element (e.g., 313). If it is further determined that one of the disks mapped by the mapping information element 313 in FIG. 4 also fails, the system can continue to override the mapping information element which is earliestly stored in the storage space 300 (which is the mapping information element 311 at this point) with the newly created mapping information element. In such a case, it will be understood that the storage system of the present disclosure can implement storage of the newly created mapping information element in the storage space by overriding the previously stored mapping information elements 310, 311, 312, 313 and 314 sequentially when it is required to store a mapping information element in an overriding manner.

At block 540, respective storage sequence numbers are allocated to the one or more mapping information elements stored into the storage space, to record an order in which each mapping information element of the one or more mapping information elements is stored in the storage space. Step 540 plays a role of determining a storage position of the mapping information element corresponding to the storage sequence number in the storage space 300 by means of the storage sequence number, to subsequently perform the I/O read and write operations, especially the I/O read operations.

In some embodiments, the storage sequence number corresponding to a last mapping storage unit stored into the storage space can be recorded as the current storage sequence number (current_plan).

In some embodiments, a modulo operation can be performed using a storage sequence number indicated by the I/O read request with respect to a predetermined number of mapping information elements allowed for storage in the storage space, to determine the storage position of the mapping information element indicated by the storage sequence number in the storage space 300. In some further embodiments, it can be further determined whether the mapping information element corresponding to the storage sequence number indicated by the I/O read request is overridden by other mapping information element in the storage space 300.

At block 550, in response to receiving an I/O request for the stripe and the I/O request indicating one of the corresponding storage sequence numbers, the stripe is accessed based on a mapping information element corresponding to the storage sequence number indicated by the I/O request in the storage space.

In some embodiments, the I/O request can be a write request, wherein accessing the stripe can include: obtaining the current storage sequence number; obtaining a mapping information element corresponding to the current storage sequence number from the storage space; and writing data into the stripe based on the obtained mapping information element.

For example, with reference to FIG. 4, when the current storage sequence number is 3, the storage system can obtain from the storage space a mapping information element corresponding to the current storage sequence number 3; and write data into the stripe based on the obtained mapping information element.

In some embodiments, the I/O request can be a read request, wherein the I/O read request indicates one of the storage sequence numbers to be read, where accessing the stripe includes: acquiring, from the storage space, a mapping information element corresponding to the storage sequence number indicated by the read request; and reading data from the stripe based on the obtained mapping information element.

It will be understood that historical fault state and current fault state of the disks mapped by the mapping information element influence the I/O read request. For example, when the historically faulted disk is not recovered yet or the current disk fails, the storage system cannot read data directly from the faulted disk.

Figure 6:
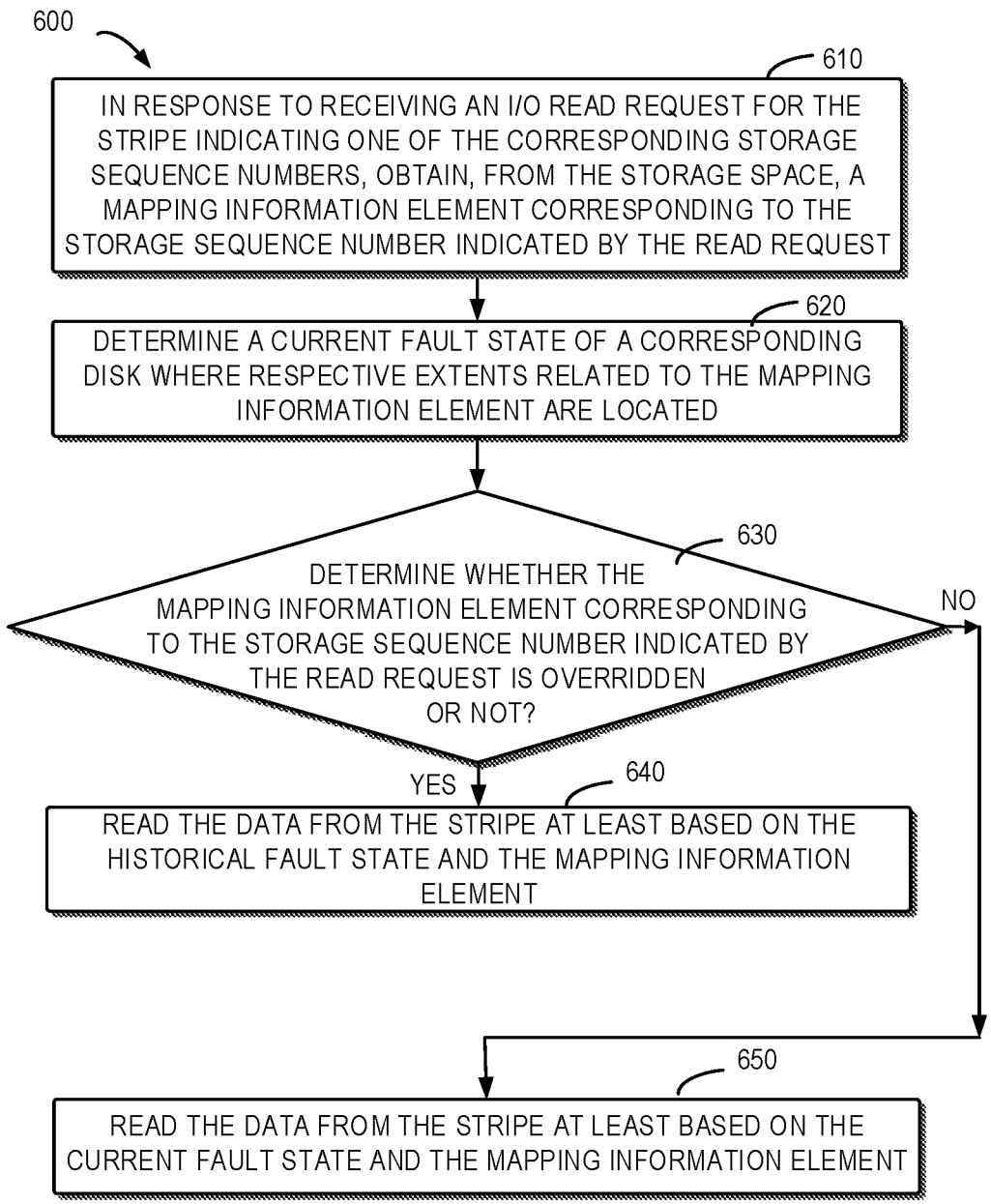
FIG. 6 illustrates a flowchart of a method for reading data from the disks in response to the I/O read request in accordance with the embodiments of the present disclosure.

In order to more clearly describe how to perform the I/O read operation based on the historical fault state and the current fault state, FIG. 6 illustrates a flowchart of a method 600 for reading data from the disks in response to the I/O read request in accordance with the embodiments of the present disclosure.

According to FIG. 6, in response to receiving the I/O read request for the stripe indicating one of the corresponding storage sequence numbers at block 610, a mapping information element corresponding to the storage sequence number indicated by the read request is obtained from the storage space.

Next, at block 620, the current fault state of the corresponding disks where the respective extents related to the mapping information element are located is determined. The step 620 is executed to determine whether the faulted disk has been recovered while performing the I/O read operation.

In some embodiments, in order to obtain the current fault state of the corresponding disks where the respective extents related to the mapping information element are located, a disk state mask (dead bitmask) indicating the current state of the plurality of disks can be obtained by scanning a plurality of disks where the respective extents mapped by the mapping information element are located. It will be understood that the above disk state mask can be provided for indicating the current fault state of the disk.

Although the current fault state of the corresponding disk is considered above, it will be understood that the mapping information element corresponding to the storage sequence number indicated by the I/O read request may be overridden. In such case, a true state of the disk mapped by the overridden mapping information element cannot be obtained in accordance with the current fault state of the disk.

Therefore, it is determined, at block 630, whether the mapping information element corresponding to the storage sequence number indicated by the read request is overridden or not.

In some embodiments, it is judged, at the block 630, whether the mapping information element is overridden by computing whether the storage sequence number indicated by the I/O is smaller than "the current storage sequence number–a predetermined number of mapping information elements+1".

If the storage sequence number indicated by the I/O read request<(the current storage sequence number–a predetermined number of mapping information elements+1), it is judged that the mapping information element corresponding to the storage sequence number indicated by the I/O request is overridden; otherwise, it is judged as not overridden.

Just as an example, when the storage sequence number is 3 according to FIG. 4, the predetermined number of the mapping information elements is 3; if the storage sequence number indicated by the I/O read request is 0, it can be determined that the mapping information element corresponding to the storage sequence number 0 indicated by the I/O request is overridden; for the storage sequence number indicated by other I/O read requests, such as 1 and 2, it can be determined that the corresponding mapping information element is not overridden.

In response to being overridden, the data can be read from the stripe at least based on the historical fault state and the mapping information element, wherein the historical fault state of the corresponding disk mapped by the recorded mapping information element can be marked by an extent position mask (degrade_bitmask).

For example, an extent position mask degrade_bitmask corresponding to each mapping information element can be created for the mapping information elements 310, 311 and 312 in FIG. 4. As an example only, in case that disks where the extents mapped by D2, S1 and S2 are located in FIG. 4 malfunction, the extent position mask corresponding to the mapping information elements 310, 311 and 312 has degrade_bitmask=0x04. It would be understood that if the above D2, S1 and S2 are in the same column, it is required to create only one extent position mask degrade_bitmask to identify a position of the faulted disk corresponding to the extent in a RAID stripe. However, if D2, S1 and S2 are in different columns, it may be required to create different extent position masks degrade_bitmask to identify the positions of the corresponding faulted disks in the mapping information elements 310, 311 and 312.

It will be understood that the storage processor can determine, based on the historical fault state, which disk in the mapping information element has malfunctioned. Furthermore, the storage system can recover the data stored on the faulted disk based on the RAID technology using other disks mapped by the mapping information element corresponding to the indicated storage sequence number, so as to implement the reading of data. Although such reading of data has a lower efficiency than the data read from the normal disks, the data is read after all and the reading of data can be accordingly known as "degraded read."

For example, for the I/O read request with a storage sequence number 0 in FIG. 4, the storage processor for example can read out the data from the disks based on the mapping information element 310 indicated by the storage sequence number 0 and the corresponding extent position mask. Here, although the storage processor cannot read out the data directly from the respective disks mapped by the mapping information element 310 because the extent position mask degrade_bitmask=0x04 of the mapping information element 310 indicates a failure of the disk mapped by the mapping item D2, the storage processor can recover, in accordance with the RAID technology, the data stored on the faulted disk mapped by D2 from the disks mapped by other mapping information items D0, D1, D3 and D4 in the mapping information element 310, so as to implement "degraded read" of the data for the I/O read request.

In response to not being overridden, the data is read from the stripe at least based on the current fault state and the mapping information element at block 650.

In some embodiments, the current fault state of the disk can be marked by the above described disk state mask. If the disk state mask is 0, it means that no fault occurs in the disks mapped by the mapping information element corresponding to the storage sequence number indicated by the I/O read request and the data can be read normally from the disks based on the mapping information element corresponding to the storage sequence number indicated by the I/O read request; if the disk state mask is 1, it means that the disks mapped by the mapping information element corresponding to the storage sequence number indicated by the I/O read request are currently malfunctioning and the data is read in a degraded manner from the disks based on the disk state mask and the mapping information element corresponding to the storage sequence number indicated by the I/O read request.

For example, with reference to FIG. 4, the mapping units corresponding to the storage sequence numbers 1, 2, 3 and 4 are not overridden for the I/O read requests indicated with storage sequence number being 1, 2, 3 and 4. Accordingly, the storage processor also can read data from the disks based on the mapping information elements corresponding to the storage sequence numbers 1, 2, 3 and 4 and the disk state mask.

Embodiments of the present disclosure have been described in details, including how to store a newly created mapping information element through overriding the already stored mapping information element in the storage space, and how to allocate a storage sequence number to every stored mapping information element to overcome the possible "glitch issues" of the existing storage system, and how to perform the I/O read and write operations in the context of the RAID management solution. It will be understood that this storage management solution can effectively avoid possible "glitch issues" of the storage system and perform accurate I/O read and write operations on the disks based on the mapping information element corresponding to the storage sequence number indicated by the I/O request and other information, such as an extent position mask and a disk state mask etc., as much as possible (instead of reading in a degraded manner). Apparently, the storage management solution of the present disclosure effectively improves the storage performance of the existing storage systems.

Figure 7:
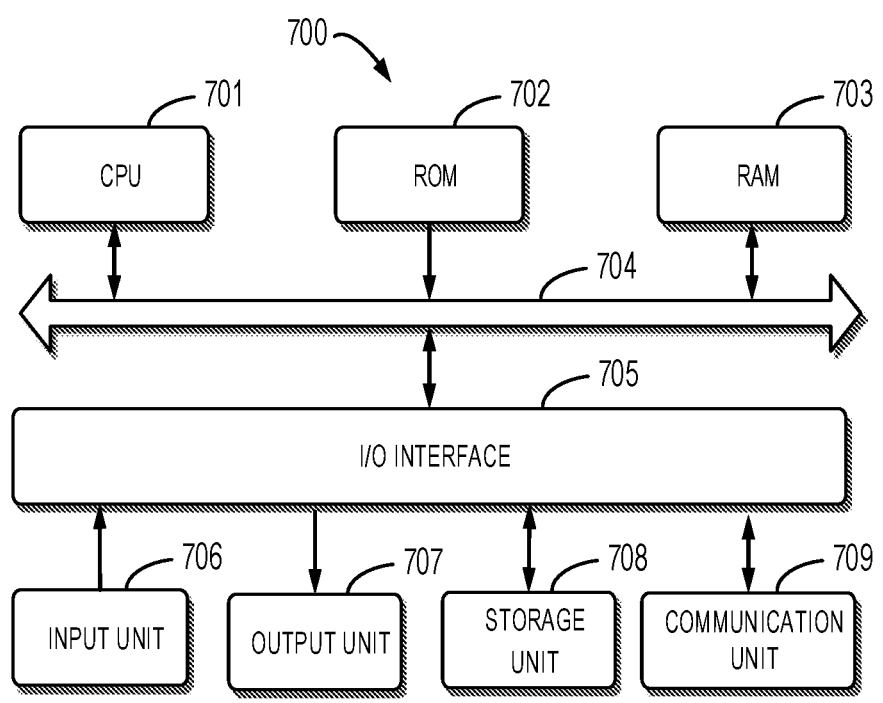
FIG. 7 illustrates a block diagram of a device that may implement embodiments of the present disclosure.

FIG. 7 illustrates a schematic block diagram of an example computing device 700 for implementing embodiments of the present disclosure. The device 700 can be used for implementing the storage processor 150 shown in FIG. 1. As demonstrated in FIG. 7, the device 700 includes a central process unit (CPU) 701, which can execute various suitable actions and processing based on the computer program instructions stored in the read-only memory (ROM) 702 or computer program instructions loaded in the random-access memory (RAM) 703 from a storage unit 708. The RAM 703 can also store all kinds of programs and data required by the operations of the device 700. CPU 701, ROM 702 and RAM 703 are connected to each other via a bus 704. The input/output (I/O) interface 705 is also connected to the bus 704.

A plurality of components in the device 700 is connected to the I/O interface 705, including: an input unit 706, such as keyboard, mouse and the like; an output unit 707, e.g., various kinds of display and loudspeakers etc.; a storage unit 708, such as memory and optical disk etc.; and a communication unit 709, such as network card, modem, wireless transceiver and the like. The communication unit 709 allows the device 700 to exchange information/data with other devices via the computer network, such as Internet, and/or various telecommunication networks.

The processing unit 701 executes the above described each method and processing, such as method 500. For example, in some embodiments, the method 500 or 600 can be implemented as computer software program tangibly included in the machine-readable medium, e.g., storage unit 708. In some embodiments, the computer program can be partially or fully loaded and/or mounted to the device 700 via ROM 702 and/or communication unit 709. When the computer program is loaded to RAM 703 and executed by the CPU 701, one or more steps of the above described methods 500 and 600 can be implemented. Alternatively, in other embodiments, the CPU 701 can be configured via any other suitable ways (e.g., by means of firmware) to execute the methods 500 and 600.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a peer machine or entirely on the peer machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the shown particular order or in a sequential order, or all shown operations are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

We claim:

1. A method for managing a Redundant Array of Independent Disks (RAID), comprising:
   in response to a stripe being created in the RAID, allocating to the stripe a storage space for storing a predetermined number of mapping information elements, the RAID being built on a plurality of extents divided from a plurality of disks, the stripe comprising a portion of the plurality of extents, and a mapping information element of the stripe recording respective locations of extents comprised in the stripe at the plurality of disks;
   creating one or more mapping information elements for the stripe;
   storing the one or more mapping information elements in the storage space;
   allocating respective storage sequence numbers to the one or more mapping information elements stored in the storage space, to record an order in which each mapping information element of the one or more mapping information elements is stored in the storage space;
   in response to receiving an I/O request for the stripe indicating one of the respective storage sequence numbers, accessing the stripe based on the mapping information element in the storage space that is corresponding to the storage sequence number indicated by the I/O request; and
   recording a storage sequence number allocated to a last mapping information element stored into the storage space, as a current storage sequence number.

2. The method of claim 1, wherein creating one or more mapping information elements for the stripe comprises:
   creating a first mapping information element for the stripe, the stripe comprising a first set of extents in the plurality of extents and the first mapping information element recording respective locations of the first set of extents at the plurality of disks.

3. The method of claim 2, wherein storing the one or more mapping information elements comprises:
   determining whether a first space in the storage space is available for storing the first created mapping information element; and
   in response to determining that the first space is available, storing the first mapping information element in the first space.

4. The method of claim 2, wherein creating one or more mapping information elements for the stripe further comprises:
   in response to failure of a disk where a first extent in the first set of extents is located, obtaining a second set of extents corresponding to the stripe by replacing the first extent in the first set of extents with a second extent in the plurality of extents; and
   creating a second mapping information element for the stripe to record respective locations of the second set of extents at the plurality of disks.

5. The method of claim 4, wherein storing the one or more mapping information elements further comprises:
   determining whether a second space in the storage space is available for storing the second created mapping information element;
   in response to determining that the second space is available, storing the second mapping information element in the second space; and
   in response to determining that the second space is unavailable, storing the second mapping information element into the first space by overriding the first mapping information element with the second mapping information element.

6. The method of claim 1, wherein the I/O request is a write request, and accessing the stripe comprises:
   obtaining the current storage sequence number;
   obtaining, from the storage space, a mapping information element corresponding to the current storage sequence number; and
   writing data into the stripe based on the obtained mapping information element.

7. The method of claim 1, wherein the I/O request is a read request and the read request indicates one of the respective storage sequence numbers, and wherein accessing the stripe comprises:
   obtaining, from the storage space, a mapping information element corresponding to the storage sequence number indicated by the read request; and
   reading data from the stripe based on the obtained mapping information element.

8. The method of claim 7, wherein reading data from the stripe comprises:
determining a historical fault state of a corresponding disk where respective extents related to the mapping information element are located;
determining a current fault state of the corresponding disk; and
reading the data from the stripe at least based on the historical fault state and the current fault state.

9. The method of claim 8, wherein reading the data from the stripe comprises:
reading the data from the stripe based on the predetermined number, the current storage sequence number, the storage sequence number indicated by the read request, the historical fault state, and the current fault state.

10. The method of claim 1, wherein creating one or more mapping information elements for the stripe includes:
creating a first mapping information element for the stripe at a first point in time, and
creating a second mapping information element for the stripe at a second point in time, the second point in time being after the first point in time; and
wherein storing the one or more mapping information elements in the storage space includes:
storing the first mapping information element for the stripe in the storage space, and
storing the second mapping information element for the stripe in the storage space while the first mapping information element for the stripe remains stored in the storage space.

11. The method of claim 1, further comprising:
creating a new mapping information element for the stripe;
in response to determining that the storage space is insufficient for storing the new mapping information element, determining an oldest stored mapping information element for the stripe stored in the storage space based on the respective storage sequence numbers; and
writing the new mapping information element in the storage space in place of the oldest stored mapping information element.

12. A device for managing a Redundant Array of Independent Disks (RAID), comprising:
a processing unit; and
a memory having instructions stored, the instructions, when executed by the processing unit, causing the device to perform acts of:
in response to a stripe being created in the RAID, allocating to the stripe a storage space for storing a predetermined number of mapping information elements, the RAID being built on a plurality of extents divided from a plurality of disks, the stripe comprising a portion of the plurality of extents and a mapping information element of the stripe recording respective positions of extents included in the stripe at the plurality of disks;
creating one or more mapping information elements for the stripe;
storing the one or more mapping information elements in the storage space;
allocating corresponding storage sequence numbers to the one or more mapping information elements stored in the storage space, to record an order in which each information element of the one or more mapping information elements is stored in the storage space;
in response to receiving an I/O request for the stripe indicating one of the corresponding storage sequence numbers, accessing the stripe based on the mapping information element in the storage space that is corresponding to the storage sequence number indicated by the I/O request; and
recording a storage sequence number allocated to a last mapping information element stored into the storage space, as a current storage sequence number.

13. The device of claim 12, wherein creating one or more mapping information elements for the stripe comprises:
creating a first mapping information element for the stripe, the stripe comprising a first set of extents in the plurality of extents and the first mapping information element recording respective positions of the first set of extents on the plurality of disks.

14. The device of claim 13, wherein storing the one or more mapping information elements comprises:
determining whether a first space in the storage space is available for storing the first created mapping information element; and
in response to determining that the first storage space is available, storing the first mapping information element in the first space.

15. The device of claim 13, wherein creating one or more mapping information elements for the stripe further comprises:
in response to failure of a disk where a first extent in the first set of extents is located, obtaining a second set of extents corresponding to the stripe by replacing the first extent in the first set of extents with a second extent in the plurality of extents; and
creating a second mapping information element for the stripe to record respective locations of the second set of extents at the plurality of disks.

16. The device of claim 15, wherein storing the one or more mapping information elements further comprises:
determining, for a second created mapping information element, whether a second space in the storage space is available for storing the second created mapping information element;
in response to determining that the second space is available, storing the second mapping information element in the second space; and
in response to determining that the second space is unavailable, storing the second mapping information element into the first space by overriding the first mapping information element with the second mapping information element.

17. The device of claim 12, wherein the I/O request is a write request and accessing the stripe comprises:
obtaining the current storage sequence number;
obtaining, from the storage space, a mapping information element corresponding to the current storage sequence number; and
writing data into the stripe based on the obtained mapping information element.

18. The device of claim 12, wherein the I/O request is a read request and the read request indicates one of the respective storage sequence numbers, and wherein accessing the stripe comprises:
obtaining, from the storage space, a mapping information element corresponding to the storage sequence number indicated by the read request; and
reading data from the stripe based on the obtained mapping information element.

19. The device of claim 18, wherein reading data from the stripe comprises:
   determining a historical fault state of a corresponding disk where respective extents related to the mapping information element are located;
   determining a current fault state of the corresponding disk; and
   reading the data from the stripe at least based on the historical fault state and the current fault state.

20. The device of claim 19, wherein reading the data from the stripe comprises:
   reading the data from the stripe based on the predetermined number, the current storage sequence number, the storage sequence number indicated by the read request, the historical fault state, and the current fault state.

21. A computer program product having a non-transitory computer readable medium which stores a set of instructions to manage a Redundant Array of Independent Disks (RAID); the set of instructions, when carried out by computerized circuitry, causing the computerized circuitry to perform a method of:
   in response to a stripe being created in the RAID, allocating to the stripe a storage space for storing a predetermined number of mapping information elements, the RAID being built on a plurality of extents divided from a plurality of disks, the stripe comprising a portion of the plurality of extents, and a mapping information element of the stripe recording respective locations of extents comprised in the stripe at the plurality of disks;
   creating one or more mapping information elements for the stripe;
   storing the one or more mapping information elements in the storage space;
   allocating respective storage sequence numbers to the one or more mapping information elements stored in the storage space, to record an order in which each mapping information element of the one or more mapping information elements is stored in the storage space;
   in response to receiving an I/O request for the stripe indicating one of the respective storage sequence numbers, accessing the stripe based on the mapping information element in the storage space that is corresponding to the storage sequence number indicated by the I/O request; and
   recording a storage sequence number allocated to a last mapping information element stored into the storage space, as a current storage sequence number.

* * * * *